United States Patent [19]

van Tongeren et al.

[11] Patent Number: 5,430,820
[45] Date of Patent: Jul. 4, 1995

[54] OPTOELECTRONIC DEVICE WITH A COUPLING BETWEEN AN OPTOELECTRONIC COMPONENT, IN PARTICULAR A SEMICONDUCTOR DIODE LASER, AND AN OPTICAL GLASS FIBRE, AND METHOD OF MANUFACTURING SUCH A DEVICE

[75] Inventors: Henricus F. J. J. van Tongeren, Eindhoven, Netherlands; Jan W. Kokkelink, Hackettstown, N.J.

[73] Assignee: U.S. Philips Corporation, New York, N.Y.

[21] Appl. No.: 222,133

[22] Filed: Apr. 1, 1994

[30] Foreign Application Priority Data

Apr. 6, 1993 [BE] Belgium ............... 09300341

[51] Int. Cl.⁶ ............................... G02B 6/42
[52] U.S. Cl. ......................... 385/94; 385/88; 385/92
[58] Field of Search ................. 385/88, 89, 92, 93, 385/94, 49; 372/43; 250/227.11

[56] References Cited

U.S. PATENT DOCUMENTS

| | | | |
|---|---|---|---|
| 4,119,363 | 10/1978 | Camlibel et al. | 385/94 X |
| 4,403,243 | 9/1983 | Hakamada | 385/94 |
| 4,752,109 | 6/1988 | Gordon et al. | 385/94 |
| 4,834,491 | 5/1989 | Aoki et al. | 385/94 |
| 4,865,410 | 9/1989 | Estrada et al. | 385/92 |
| 4,927,228 | 5/1990 | van de Pas | 385/88 X |
| 5,214,660 | 5/1993 | Masuko et al. | 372/34 |
| 5,222,170 | 6/1993 | Bargar et al. | 385/88 |
| 5,247,530 | 9/1993 | Shigeno et al. | 385/92 X |
| 5,315,609 | 5/1994 | Tanaka et al. | 372/43 |

FOREIGN PATENT DOCUMENTS 0345874  12/1989  European Pat. Off. ......... 385/94 X

*Primary Examiner*—Brian Healy
*Attorney, Agent, or Firm*—Michael J. Balconi-Lamica

[57] ABSTRACT

Optoelectronic device with a coupling between an optoelectronic component, in particular a semiconductor diode laser, and an optical glass fiber, and method of manufacturing such a device.

The invention relates to an optoelectronic device (10) with a coaxial module which comprises a first holder (2) and a second holder (6) fastened thereto, in which holders are present an optoelectronic component (3), preferably a semiconductor diode laser (3), hermetically sealed off from the surroundings outside the module (1), and a glass fiber (7) aligned therewith, respectively. Conductors (22), for example connection pins (220) to which the component (3) is connected, project from the module (1). Such a module (1) forms a reliable and effective component-glass fiber coupling and is suitable for use in optical glass fiber communication systems. The invention also relates to a method of manufacturing such a device (10).

7 Claims, 2 Drawing Sheets

OPTOELECTRONIC DEVICE WITH A COUPLING BETWEEN AN OPTOELECTRONIC COMPONENT, IN PARTICULAR A SEMICONDUCTOR DIODE LASER, AND AN OPTICAL GLASS FIBRE, AND METHOD OF MANUFACTURING SUCH A DEVICE

BACKGROUND OF THE INVENTION

The invention relates to an optoelectronic device comprising a coaxial module comprising a first holder for an optoelectronic component, preferably a semiconductor diode laser, which is hermetically sealed off from the atmosphere outside the module and is electrically connected to first conductors passed through a bottom plate of the first holder in an insulated manner and to a second holder which is connected to the first holder and which is to accommodate an optical glass fibre aligned relative to the component. The invention also relates to a method of manufacturing such a device. An optoelectronic component and a semiconductor diode laser will often be referred to hereinafter as component and laser.

Such devices are widely used in systems for optical glass fibre communication.

Such a device is known from European Patent application no. 89201390.5 published under no. 0 345 874 on 13 Dec., 1989, which corresponds to U.S. Pat. No. 4,927,228 and comprises a laser-glass fibre coupling. The reliability of the module is high owing to the fact that the laser present within the module is hermetically sealed off from the surroundings of the module. It can be connected to, for example, a printed circuit board by means of the conductors which are passed through the bottom plate of the laser in an insulated manner.

A disadvantage of the known device is that, when it is mounted on e.g. a printed circuit board, it is perpendicular to the printed circuit board with its greatest dimension, i.e. the axial dimension, so that this form of final mounting requires comparatively much space. Moreover, the first connection conductors of the module, which are often arranged in a circle, are less suitable for a number of applications, especially when an "IC-type" final mounting of the device and/or a very high system speed is required.

The invention has for its object to provide a device of the kind mentioned in the opening paragraph which does not suffer from the disadvantages mentioned above, or at least to a much lesser degree.

SUMMARY OF THE INVENTION

According to the invention, a device of the kind mentioned in the opening paragraph is for this purpose characterized in that the device comprises a box in which the module is accommodated and of which at least one side face is provided with at least one row of second conductors which are passed therethrough in an insulated manner, which side face has an opening through which the optical glass fibre projects from the box, while said box also comprises means by which the module is fastened in the box and by which the first conductors are electrically connected to the second conductors. The invention is based on the recognition that major advantages are obtained through the arrangement of such a module in such a box. Thanks to the use of a box of which one side face is provided with a row of conductors, the device according to the invention may be readily mounted on a printed circuit board in a compact manner. The box need not be hermetically sealed off from the surroundings for protecting the component (laser) owing to the use of a module in which the component (laser) is hermetically sealed off from the atmosphere outside the module. On the same grounds, glues from which gases may be evolved which are noxious to the component (laser) can be used against or inside the box. Gluing as a sealing or mounting technique is simple and accordingly attractive. The presence of means by which the module is fastened in the box and by which the first conductors are electrically connected to the second conductors implies that the module can be manufactured entirely outside the box, and the disadvantage is lifted that the component (laser) in such a module is no longer accessible for, for example, effecting a wire connection. Since the critical step of aligning and fixing of the component (laser) and the glass fibre relative to one another has already taken place outside the box, the manufacture of the device according to the invention, which now substantially consists in placing the module in the box, is comparatively simple. The fact that the module outside the box is easily accessible at all sides, for example for laser welding, plays an important part in this respect. It is further noted that the module in itself is already an attractive component which is suitable for many applications, and which will accordingly be frequently held in stock. An important advantage of a device according to the invention, therefore, is that it can be supplied at comparatively short notice.

The means by which the module is fastened in the box may be simple means such as a clamp and/or glue connection. The means by which the first conductors are electrically connected to the second conductors may comprise simple means such as wire connections.

In a preferred embodiment, the module is round at the area of the first holder and the means by which the module is fastened in the box comprise a block-shaped body whose upper side is provided with a round recess in which the first holder is fastened, which body is fastened to a side wall of the box, preferably by means of a Peltier element and/or a cooling plate. A round first holder connects well to a round TO (=Transistor Outline) or similar standard foot which is usual in component (laser) mounting. The module is securely fastened to the box and in good thermal contact therewith thanks to the round recess in the body. The temperature of the module may thus be well stabilized. Glues may be used for fastening the module in the body and the body in the box. A Peltier element and/or a cooling plate promote a stable laser temperature, also when the box walls have a comparatively bad heat conduction. Fastening of the module in the box may be improved in that the block-shaped body is made longer.

Preferably, the means by which the first and second conductors are connected to one another comprise a plate of an electrically insulating material of which one side is fully covered with a conducting layer and the other side is coated with conductor tracks of which the one ends are connected to the first conductors and the other ends to the second conductors, while preferably one of the second conductors inside the box is of coaxial construction. Such a "strip line" technology and a coaxial second conductor inside the box have the important advantage that the electrical connection between the first and second conductors renders possible the use of the device at very high frequencies—above 1 or even above 10 GHz.

In a favourable modification, the lower surface of the box is provided with two parallel rows of second conductors which are passed through it in an insulated manner. As a result, the device forms a so-called DIL (=Dual In Line) envelope which can be easily tested and mounted, for example, on a printed circuit board. In another favourable modification, the two parallel side faces of the box are each provided with one row of second conductors passed through them in an insulated manner. Such an envelope is called "Butterfly" envelope and is especially suitable for applications with a high system speed.

In a particularly favourable embodiment, the coaxial module further comprises an intermediate piece situated between the first and second holder, the intermediate piece and one of the two holders being arranged so that they can slide one into the another, one of these parts having an annular connection piece of reduced diameter, the connection piece of reduced diameter of the one part being fastened to the surface of the other part by means of a number of laser welds after axial alignment of the end of the optical glass fibre relative to the component (laser), while the mutually facing ends of the intermediate piece and the other holder have plane surfaces which run transversely to the axial alignment direction and by which the latter pans bear on one another, while one of these pans has a flange of reduced diameter, the flange of reduced diameter of the one pan being fastened to the surface of the other pan also by means of a number of laser welds after transverse alignment of the end of the glass fibre relative to the component (laser). Such a device has a particularly accurate, stable and reliable coupling between the component and the glass fibre (laser-glass fibre) and is accordingly highly suitable for use in optical glass fibre communication systems.

In this last-mentioned embodiment, the first holder of the module preferably comprises a lens and the intermediate piece comprises an optical insulator. The lens provides an even better component (laser)-glass fibre coupling, while the optical insulator ensures that there is no detrimental feedback from the glass fibre to the component (laser). When the lens is in or against the first holder, a space is created in the intermediate piece in which the optical insulator can be accommodated. Owing to the fact that the optical insulator is accommodated in the module and not outside it (or even outside the box), the temperature of the insulator is also stabilized, so that a less expensive insulator can be used, i.e. an epitaxially manufactured insulator instead of an insulator comprising a bulk crystal.

A method of manufacturing an optoelectronic device in which a coaxial module is formed by a first holder which comprises an optoelectronic component, preferably a semiconductor diode laser, and which is provided with a bottom plate with first conductors passed through it in an insulated manner whereby the component is electrically connected, and by a second holder for an optical transmission fibre, which module hermetically seals off the component from the surroundings of the module and in which module the transmission fibre is aligned relative to the component, according to the invention, is characterized in that the module thus manufactured is accommodated in a box of which at least one side face is provided with at least one row of second conductors passed therethrough in an insulated manner, and means are provided in the box whereby the module is fastened in the box and whereby the first conductors are electrically connected to the second conductors. The particularly advantageous devices according to the invention are obtained in a simple manner by such a method.

BRIEF DESCRIPTION OF THE DRAWING

The invention will be explained in more detail with reference to an embodiment shown in the drawing.

DETAILED DESCRIPTION OF THE PREFERRED EMBODIMENTS

Figure 1:
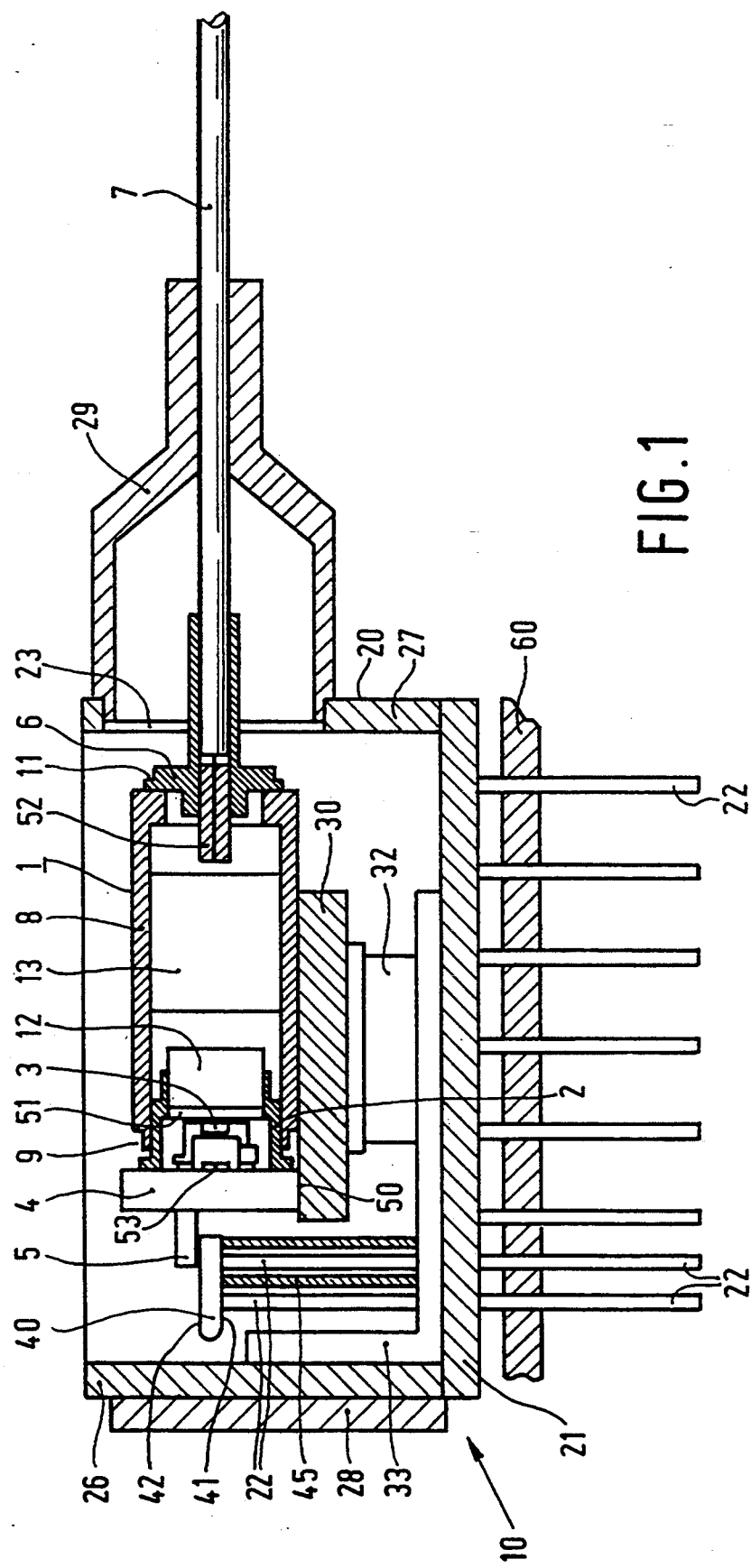
FIG. 1 diagrammatically shows partly a side elevation and partly a cross-section parallel to the longitudinal direction of an optoelectronic device according to the invention.

FIG. 1 diagrammatically shows partly a side elevation and partly a cross-section parallel to the longitudinal direction of an optoelectronic device 10 according to the invention. The device 10 comprises a coaxial module 1 which contains a first holder 2 with an optoelectronic component 3, here a semiconductor diode laser 3, and a second holder 6 which is connected to the first holder 2 and comprises an optical glass fibre 7 aligned with the laser 3. A bottom plate 4 of the first holder 2, which here comprises a metal foot 50, comprises three conductors 5 which are passed through in an electrically insulated manner. Only two conductors 5 are shown in the drawing, i.e. those by which the laser 3 is electrically connected by means of wire connections (not shown in the drawing). The glass fibre 7 is fastened in the second holder 6 by means of a ferrule 52. According to the invention, the device 10 also comprises a box 20 in which the module 1 is accommodated; at least one side face 21, here the bottom surface, of the box 20 is provided with at least one row, here two rows, of second conductors 22 passed through in an insulated manner; the box 20 is provided with an opening 23 through which the optical glass fibre 7 issues from the box 20; and the box 20 comprises means 30, 40 by which the module 1 is fastened in the box 20 and by which the first conductors 5 are electrically connected to the second conductors 22 which are passed through in an insulated manner. Such a device 10 offers major advantages. It comprises, for example, a DIL or Butterfly envelope whereby a compact mounting on a printed circuit board 60 is rendered possible. Since the module 1 hermetically seals off the laser 3, the box 20 need not be hermetically sealed off. This has the advantage inter alia that glue connections can be used. It is also possible to use glues from which gases detrimental to the laser 3 may be evolved. The comparatively critical module 1 may be manufactured previously, outside the box 20. When the module 1 is kept in stock, a wide range of products can be supplied at short notice.

The module 1 is round and the means 30 comprise a block-shaped copper body 30 whose upper side is provided with a round recess 31 in which the first holder 2 is fastened. The block-shaped body 30 is connected to the bottom surface 21 by means of a Peltier element 32 and a copper cooling plate 33. The temperature of the laser 3 and of the module 1 is stabilized thereby. The means 40 comprise a plate 40 of an insulating material, for example ceramic material, of which one side 41 is fully covered with a conducting layer and the other side 42 is covered with conductor tracks 43, 44. The conductor track 43 is earthed, the conductor track 44 supplies a signal to the laser 3. The one ends of the conductor tracks 43, 44 are connected to the first conductors 5, for example by soldering. The other ends are connected to the second conductors 22, also by soldering. The conductor 22 to which the conductor track 44 is connected is of coaxial construction, i.e. a metal cylinder 45 is present around this second conductor 22 inside the box 20. Owing to this "strip line" technology and the coaxial design of the signal path to the laser 3, the device 10 can be used at high system speeds such as 1 GHz or even 10 GHz.

The DIL box 20 used renders testing and mounting of the device 10 easy. In a "Butterfly" modification mentioned above, the side faces 24, 25 of the box 20 each comprise one row of second conductors 22 passed through the wall in an insulated manner. Such a box 20 is highly suitable for high-speed systems. The box 20 is then mounted, for example, in a recess of the printed circuit board 60.

The coaxial module 1 in this embodiment comprises an intermediate piece 8 situated between the first holder 2 and the second holder 6. The intermediate piece 8 and one of the two holders 2, 6, in this case the holder 2, are provided so that they can slide one into the other, and one of the said parts 2, 8, here the part 8, has an annular connection piece 9 of reduced diameter, which connection piece 9 of reduced diameter of the one pan, here pan 8, is fastened to the surface of the other pan, here pan 2, by means of a number of laser welds (not shown in the drawing) after axial alignment of the end of the optical glass fibre 7 relative to the laser 3. The mutually facing ends of the intermediate piece 8 and of the other holder, here holder 6, have plane surfaces which are transverse to the axial alignment direction and by which the parts last mentioned, so the parts 6, 8, bear on one another, while one of these parts 6, 8, here the part 6, has a flange 11 of reduced diameter, the flange 11 of reduced diameter of the one part, i.e. the part 6, being fastened to the surface of the other part, i.e. the part 8, by means of a number of laser welds after transverse alignment of the end of the glass fibre 7 relative to the laser 3. A device 10 according to the invention has a very good and reliable laser-glass fibre coupling and is comparatively easy to manufacture owing to such a, usually round, module.

A lens 12 is present in an opening 51 of the first holder 2, which contributes to a good laser-glass fibre coupling. The intermediate piece 8 offers space to an optical insulator 13 which counteracts an undesirable optical feedback to the laser 3 and whose temperature is comparatively stable thanks to its position inside the module 1. This offers the advantage inter alia that a comparatively inexpensive insulator 13 manufactured by epitaxial techniques can be used. The insulator 13 here comprises BIG (=Bismuth Iron Garnet).

The angled cooling plate 33 comprises copper, as does a further cooling plate 28 arranged against the side face 26. Copper has an approximately 25 times better heat conduction than Kovar or Fernico (alloys comprising iron, cobalt and nickel), from which the walls 21, 24, 25, 26, 27 as well as the lid of the box 20 (not shown) are manufactured. The walls of the box 20 are approximately 1 mm thick and the dimensions of the box 20 are approximately $2.5 \times 1.5 \times 1.5$ cm$^3$. The diameter of the module 1 is approximately 0.6 cm, its length is approximately 1.2 cm. The portion of the optical glass fibre 7 projecting from the box 20 is glued to the box 20 by means of a metal cap 29 which serves as a stress relief. The laser 3 is sealed off hermetically from the surroundings of the module 1 inside the first holder 2 already. The first holder 2 also comprises a monitor diode 53 by which the optical power of the laser 3 is measured. The monitor diode 53 comprises one earth connection in common with the laser 3: a first conductor 5, conductor track 43, and a second conductor 22. Another electrical connection of the monitor diode 53 runs through the third one (not shown) of the first connection conductors and a third (also not shown) conductor track to a third one of the second conductors 22.

Figure 2:
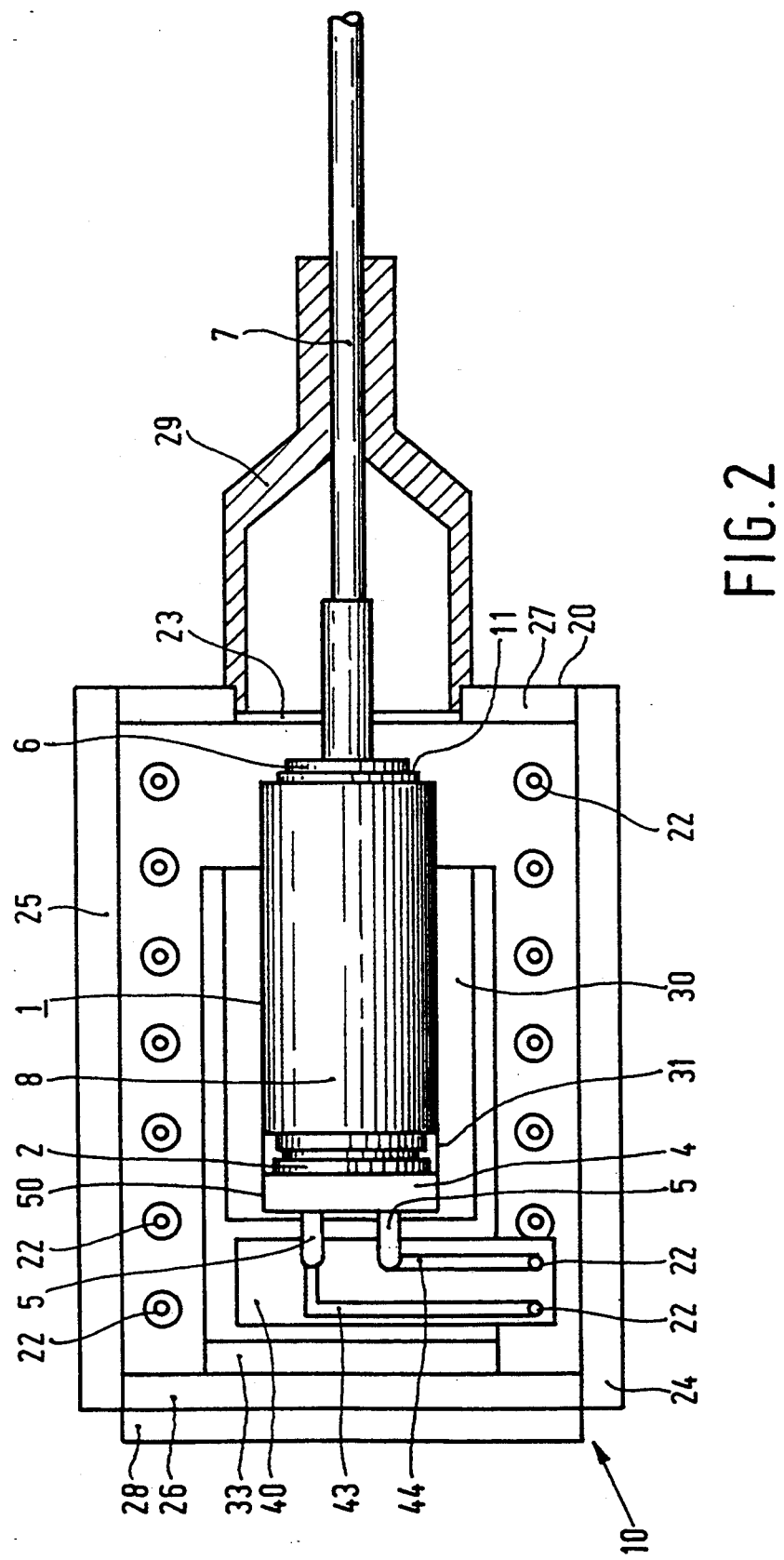
FIG. 2 is a diagrammatic plan view of the device of FIG. 1.

The device 10 in the present example is manufactured by a method according to the invention in the following manner. First the coaxial module 1 is manufactured as described in the European Patent Application cited above. In this module 1, the laser 3 is hermetically sealed off from the surroundings outside the module 1 from which first conductors 5 project. Subsequently, according to the invention (see FIGS. 1 and 2), the module 1 is enclosed in a box 20 of which at least one side face 21 is provided with at least one row of second conductors 22 which are passed therethrough in an insulated manner. According to the invention, means 30, 40 are provided in the box 20 during this, by which means the module 1 is fastened in the box and the first conductors 5 are connected to to the second conductors 22. The means 30 preferably comprise a block-shaped body 30 with a round recess 31 in which the circular portions of the module 1 are accommodated. The block 30 may be fastened first on the module 1 or first in the box 20. It is also possible for the two fastenings to be effected simultaneously. The means 40 preferably comprise a plate 40 of an insulating material which is provided with conductor tracks 44, 45 which are connected to the first conductors 5 and to the second conductors 22. Preferably, the plate 40 is first connected to the module 1. For this purpose, the first conductors 5, which are arranged in a circle, are bent so as to lie in one plane. The plate 40 is then connected to the second conductors 22 during or after the placement of the module 1 in the box 20.

The invention is not limited to the embodiment described, since many modifications and variations are possible to those skilled in the art within the scope of the invention. Thus different materials or different dimensions from those mentioned in the example may be used. It is noted particularly that, although the device according to the invention preferably comprises a semiconductor diode laser as the optoelectronic component, the invention is not limited to this. The invention may also advantageously comprise different optoelectronic components such as a photodiode or an LED (=Light Emitting Diode).

We claim:

1. An optoelectronic device comprising a coaxial module hermetically sealed off from the atmosphere outside the module;

a first holder for an optoelectronic component, preferably a semi-conductor diode laser, electrically connected to first conductors passed through a bottom plate of the first holder in an insulated manner;

a second holder connected to the first holder for accommodating an optical glass fibre aligned relative to the optoelectronic component;

a box for accommodating the module, the module being round at least in the area of the first holder, at least one row of second conductors which are passed through at least one side face of the box in an insulated manner, the box having an opening through which the optical glass fibre projects from the box; and said box further comprises a block-shaped body by which the module is fastened in the box and whose upper side is provided with a round recess in which the first holder is fastened and which body is fastened to a side face, preferably by means of a Peltier element and a cooling plate, and an electrical connector between the first conductors and the second conductors.

2. An optoelectronic device according to claim 1, in which the connector comprises a plate of an electrically insulating material fully covered with a conducting layer on one side and coated with conductor tracks on another side of which the one ends are connected to the first conductors and the other ends to the second conductors, while preferably one of the second conductors inside the box is of coaxial construction.

3. An optoelectronic device according to claim 1, in which the lower surface of the box is provided with two parallel rows of second conductors which are passed through it in an insulated manner.

4. An optoelectronic device according to claim 1, in which two parallel side faces of the box are each provided with one row of second conductors passed through in an insulated manner.

5. An optoelectronic device comprising a coaxial module hermetically sealed off from the atmosphere outside the module;

a first holder for an optoelectronic component, preferably a semi-conductor diode laser, electrically connected to first conductors passed through a bottom plate of the first holder in an insulated manner;

a second holder connected to the first holder for accommodating an optical glass fibre aligned relative to the optoelectronic component;

a box for accommodating the module, the module being round at least in the area of the first holder, at least one row of second conductors which are passed through at least one side face of the box in an insulated manner, the box having an opening through which the optical glass fibre projects from the box; and said box further comprises a block-shaped body by which the module is fastened in the box and whose upper side is provided with a round recess in which the first holder is fastened and which body is fastened to a side face, preferably by means of a Peltier element and a cooling plate, and an electrical connector between the first conductors and the second conductors; and in which said coaxial module further comprises an intermediate part situated between the first and second holders, the intermediate part and one of the two holders being arranged so that they can slide one into the other, the intermediate part having an annular connection piece of reduced diameter, wherein the connection piece is fastened to the surface of the first holder by means of a number of laser welds after axial alignment of the optical glass fibre relative to the component, wherein the mutually facing ends of the intermediate part and the second holder have plane surfaces running transversely to the axial alignment direction by which the intermediate part and the second holder bear on one another, wherein the second holder has a flange of reduced diameter fastened to the surface of the intermediate part by means of laser welds after transverse alignment of the end of the glass fibre relative to the component.

6. An optoelectronic device according to claim 5, in which the module comprises a lens present preferably in the first holder and the intermediate part comprises an optical insulator.

7. A method of manufacturing an optoelectronic device having a coaxial module comprising:

forming a first holder of the module which comprises an optoelectronic component, preferably a semiconductor diode laser, said holder is provided with a bottom plate with first conductors passed through it in an insulated manner whereby the component is electrically connected;

forming a second holder of the module connected to the first holder for accommodating an optical transmission fibre which fibre is aligned relative to the optoelectronic component;

hermetically sealing the optoelectronic component from the surroundings of the module; and wherein the module thus manufactured is round at least in the area of the first holder and is accommodated in a box of which at least one side face is provided with at least one row of second conductors passed there through in an insulated manner, and said box further comprises a block-shaped body by which the module is fastened in the box and whose upper side is provided with a round recess in which the first holder is fastened and which body is fastened to a side face, preferably by means of a Peltier element and a cooling plate, and an electrical connector between the first conductors and the second conductors.

* * * * *